United States Patent
Handa

(10) Patent No.: US 10,030,816 B2
(45) Date of Patent: Jul. 24, 2018

(54) FUEL FILLING SYSTEM AND FUEL FILLING METHOD THEREOF

(71) Applicant: HONDA MOTOR CO., LTD., Tokyo (JP)

(72) Inventor: Kiyoshi Handa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 36 days.

(21) Appl. No.: 15/096,593

(22) Filed: Apr. 12, 2016

(65) Prior Publication Data
US 2016/0305611 A1    Oct. 20, 2016

(30) Foreign Application Priority Data
Apr. 14, 2015 (JP) ................... 2015-082701

(51) Int. Cl.
*F17C 5/06* (2006.01)
*F17C 13/02* (2006.01)

(52) U.S. Cl.
CPC .............. *F17C 13/02* (2013.01); *F17C 5/06* (2013.01); *F17C 13/023* (2013.01);
(Continued)

(58) Field of Classification Search
CPC ...... F17C 13/02; F17C 13/028; F17C 13/026; F17C 13/023; F17C 13/025; F17C 5/06;
(Continued)

(56) References Cited

U.S. PATENT DOCUMENTS 5,868,179 A * 2/1999 Hartsell, Jr. ............. B67D 7/04
                                                    141/128
5,971,042 A * 10/1999 Hartsell, Jr. ............. B67D 7/04
                                                    141/198
(Continued)

FOREIGN PATENT DOCUMENTS

| JP | 2005283127 A | 10/2005 |
| JP | 2011-122657 A | 6/2011 |

OTHER PUBLICATIONS

Japanese Notification of Reasons for Refusal application No. 2015-082701 dated Jan. 10, 2017.

*Primary Examiner* — Nicolas A Arnett
(74) *Attorney, Agent, or Firm* — Squire Patton Boggs (US) LLP

(57) ABSTRACT

The present invention provides a fuel filling system and a fuel filling method thereof that can determine the validity of information transmitted from a vehicle side while filling fuel with high accuracy. A hydrogen gas filling method of a hydrogen filling system includes: a step of filling hydrogen gas from a hydrogen station to a hydrogen tank under a predetermined filling control law (S2); and a determination step of determining whether a measurement error parameter corresponding to a difference between a filling amount of hydrogen gas calculated using information transmitted from the vehicle side and a filling amount of hydrogen gas calculated using a mass flow meter is within a predetermined permissible range (S9). In the filling step, the filling control law is changed after starting the filling of hydrogen gas, according to a determination result obtained in the determination step (S13 and S16).

18 Claims, 6 Drawing Sheets

(52) U.S. Cl.
CPC .......... *F17C 13/025* (2013.01); *F17C 13/026* (2013.01); *F17C 13/028* (2013.01); *F17C 2221/012* (2013.01); *F17C 2250/0421* (2013.01); *F17C 2250/0434* (2013.01); *F17C 2250/0439* (2013.01); *F17C 2250/0491* (2013.01); *F17C 2250/0621* (2013.01); *F17C 2250/0631* (2013.01); *F17C 2250/0694* (2013.01); *F17C 2260/022* (2013.01); *F17C 2260/025* (2013.01); *F17C 2265/065* (2013.01); *F17C 2270/0184* (2013.01)

(58) Field of Classification Search
CPC ...... F17C 2250/0631; F17C 2250/0439; F17C 2250/0434; F17C 2250/0621; F17C 2250/0421; F17C 2250/0694; F17C 2250/0491; F17C 2221/012; F17C 2260/025; F17C 2260/022; F17C 2265/065; F17C 2270/0184
See application file for complete search history.

(56) References Cited

U.S. PATENT DOCUMENTS

| | | | |
|---|---|---|---|
| 6,352,176 B1* | 3/2002 | Hartsell, Jr. | B67D 7/085 222/1 |
| 6,666,084 B2* | 12/2003 | Schelhas | G01F 23/0076 73/290 R |
| 7,210,341 B2 | 5/2007 | Fuse | |
| 8,505,368 B2* | 8/2013 | Ye | B60L 3/0053 73/114.53 |
| 8,984,934 B2* | 3/2015 | Sweppy | G01F 23/32 73/114.54 |
| 2005/0061390 A1* | 3/2005 | Mathis | B67D 7/348 141/1 |
| 2005/0247123 A1 | 11/2005 | Fuse | |
| 2010/0185360 A1* | 7/2010 | Windbergs | G01F 23/0076 701/29.2 |
| 2014/0195047 A1* | 7/2014 | King | H04L 9/3215 700/237 |

* cited by examiner

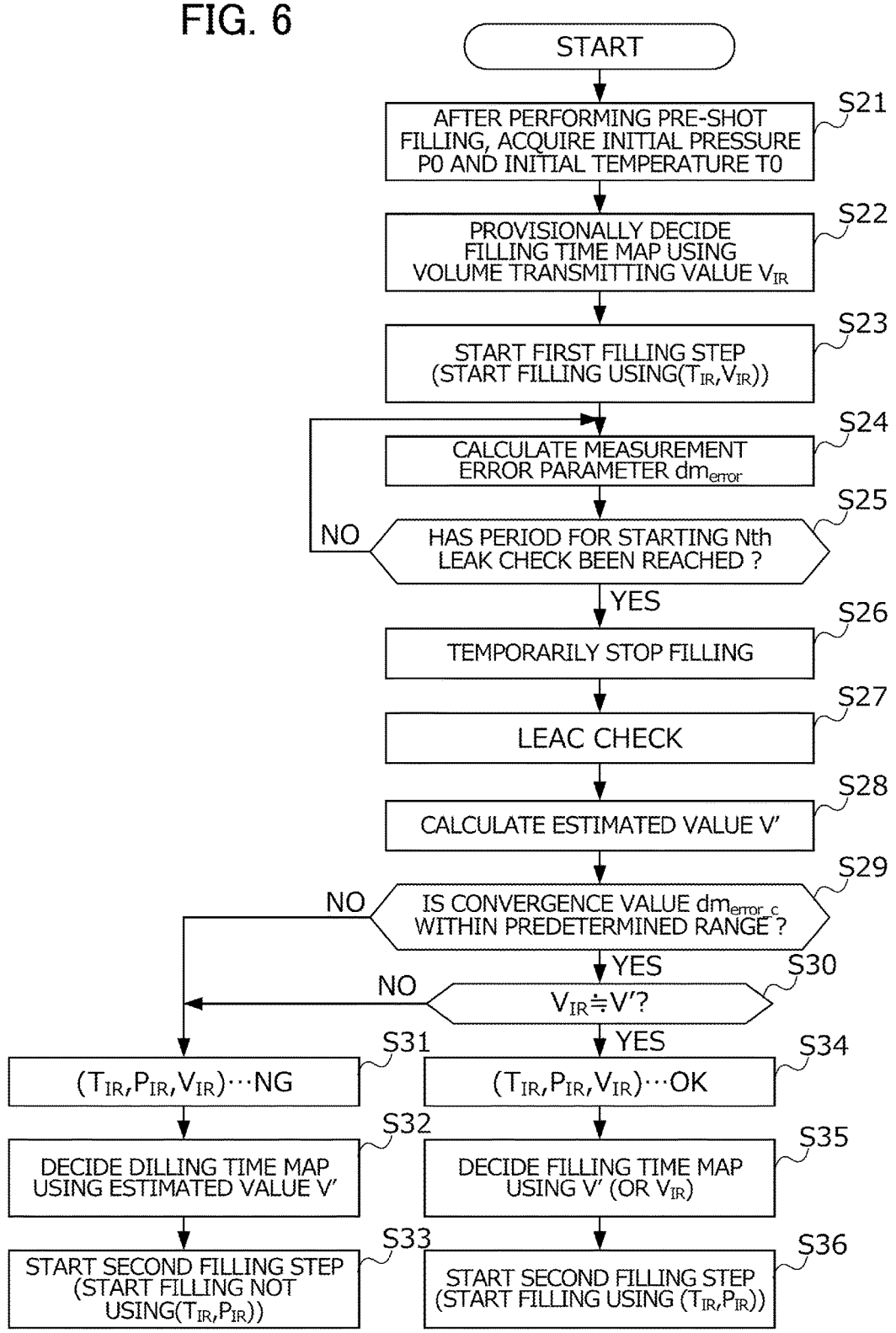

FUEL FILLING SYSTEM AND FUEL FILLING METHOD THEREOF

This application is based on and claims the benefit of priority from Japanese Patent Application No. 2015-082701, filed on 14 Apr. 2015, the content of which is incorporated herein by reference.

BACKGROUND OF THE INVENTION

Field of the Invention

The present invention relates to a fuel filling system and a fuel filling method thereof.

Related Art

Fuel cell vehicles travel by supplying oxygenated air and hydrogen to the fuel cell, and driving an electric motor using the electric power thereby generated. In recent years, progress has been made in the practical implementation of fuel cell vehicles employing such fuel cells as the energy source for generating motive power. Although hydrogen is required to generate electric power by fuel cells, with the fuel cell vehicles of recent years, vehicles have become mainstream that store a sufficient amount of hydrogen in advance in a high-pressure tank or a hydrogen tank equipped with a storage alloy, and use the hydrogen inside of the tank to travel. In concert with this, vigorous research has progressed also in the technology designated as so-called communicative filling for quickly filling the required amount of hydrogen into the tank.

Communicative filling is technology that sends information related to a hydrogen tank to a station as a data signal using some kind of communication means from the vehicle side, and fills fuel using information received at the station. Sensors that detect the temperature and/or pressure of the hydrogen gas inside the hydrogen tank, for example, are provided to the hydrogen tank. From the vehicle side, information related to the temperature and/or pressure of the hydrogen tank based on the outputs of these sensors (hereinafter, this information related to the temperature, pressure, etc. of the hydrogen tank is collectively referred to as tank state information) is sent to the station side. The station side controls the filling flowrate under the filling control laws made using the acquired tank state information, with the goal of refilling as quickly as possible.

Patent Document 1 illustrates technology for verifying whether the information sent from the vehicle side is correct. With the method of Patent Document 1, the predicted temperature of fuel inside the hydrogen tank after initial filling is calculated based on physical information of the hydrogen gas emitted from the station into the vehicle during initial filling, this predicted temperature is compared with the actual temperature of fuel inside the hydrogen tank sent from the vehicle after the initial filling, and in the case of these greatly deviating, it is judged that abnormality occurred in the temperature sensor on the vehicle side, and measures are taken such as reducing the filling flowrate, stopping, and informing of the abnormality.

Patent Document 1: Japanese Unexamined Patent Application, Publication No. 2011-122657

SUMMARY OF THE INVENTION

However, with the method of Patent Document 1, the predicted temperature after initial filling is calculated by inputting physical information such as the supply temperature and supply pressure of fuel gas emitted from the station to the fuel tank into a predictive arithmetic expression derived based on the energy conservation law. In other words, the method of Patent Document 1 determines the validity of the information sent from the vehicle side, under the premise that the predicted temperature calculated using the predictive arithmetic expression is correct. However, the temperature of fuel in the hydrogen tank during filling actually varies according to the heat released from the surfaces of the hydrogen tank, and thus it is difficult to accurately calculate the predicted temperature. For this reason, with the method of Patent Document 1, the measurement error in the predicted temperature serving as the standard is great, and it is difficult to accurately determine the validity of information sent from the vehicle side.

The present invention has an object of providing a fuel filling system and a fuel filling method thereof that can determine the validity of information sent from the vehicle while filling fuel with high accuracy.

According to a first aspect of the present invention, a fuel filling system includes: a vehicle having a transmitter for externally transmitting information related to a fuel tank, and an external filling device that fills fuel into the fuel tank using the information sent from the vehicle. A fuel filling method of the fuel filling system of the present invention includes: a filling step of filling fuel into the fuel tank from the external filling device under a predetermined filling control law; a first filling amount calculation step of calculating a filling amount of fuel within a determination period after starting the filling step, using the information sent from the transmitter; a second filling amount calculation step of calculating a filling amount of fuel in the determination period, using a mass flow meter provided to the external filling device; and a determination step of determining whether a difference between the filling amount obtained in the first filling amount calculation step and the filling amount obtained in the second filling amount calculation step is within a predetermined permissible range, in which the filling control law is changed according to a determination result obtained in the determination step, after starting filling of fuel in the filling step. It should be noted that "filling control law" in the present invention refers to a control algorithm deciding the operation amount of the flow control device based on a plurality of input signals. In addition, "changing the filling control law" is not only changing the control algorithm itself, but shall also include substantially changing the corresponding relationship between the input signals and operation amount by changing the map, increasing new input signals, and decreasing input signals used thus far, even with the same control algorithm. Furthermore, in the present invention, ending filling in itself according to the determination result shall be included in "changing the filling control law".

According to a second aspect of the present invention, in this case, it is preferable for the filling step to be divided into a first filling step that includes a period from after starting filling until the determination result is obtained, and a second filling step from after ending the first filling step, the information transmitted from the transmitter to include state information related to the state of fuel inside of the fuel tank, and characteristic information including a volume value of the fuel tank, fuel to be filled in the first filling step under a fuel control law established using the state information and the characteristic information even in a state of the determination result not having been obtained, and fuel to be filled in the second filling step under a filling control law established using the state information and the characteristic information or equivalent information thereto, in a case of determining that the difference is within the permissible range.

According to a third aspect of the present invention, in this case, it is preferable for the fuel filling method to further include a volume estimation step of calculating an estimated value V' for the volume of the fuel tank according to the below formula (1), using values acquired at a predetermined zeroth time and first time while performing the first filling step.

$$V' = \frac{R \cdot dm}{\dfrac{P_1}{T_1 \cdot Z_1} - \dfrac{P_0}{T_0 \cdot Z_0}} \quad (1)$$

In the above formula (1), "R" is a predetermined fixed value, "dm" is a value of a filling amount of fuel between the zeroth time and the first time obtained by the mass flow meter, "$T_0$" and "$T_1$" are values of the temperature of fuel inside the fuel tank at the zeroth time and the first time, respectively, "$P_0$" and "$P_1$" are values of the pressure of fuel inside the fuel tank at the zeroth time and the first time, respectively, and "$Z_0$" and "$Z_1$" are values of the compressibility factor of fuel inside the fuel tank at the zeroth time and the first time, respectively.

According to a fourth aspect of the present invention, in this case, it is preferable for filling of fuel to be temporarily stopped at the zeroth time and the first time in the first filling step, and the "$P_0$" and "$P_1$" to be measured values of a pressure sensor provided to the external filling device at the zeroth time and the first time, respectively.

According to a fifth aspect of the present invention, in this case, it is preferable for fuel to be filled in the second filling step under a filling control law established using a volume value obtained from the characteristic information or an estimated value obtained in the volume estimation step, in a case of determining that the difference is within the permissible range in the determination step and the difference between the volume value obtained from the characteristic information and the estimated value obtained in the volume estimation step being within a predetermined measurement error range.

According to a sixth aspect of the present invention, in this case, it is preferable for fuel to be filled in the first filling step until any of a pressure variation amount, mass variation amount, temperature variation amount, density variation amount of fuel inside the fuel tank from a moment starting filling of fuel and an elapsed time from the moment starting filling of fuel exceeds a determination threshold set for each thereof.

According to a seventh aspect of the present invention, in this case, it is preferable for the determination threshold to be set to the largest value within a range that can prevent the occurrence of excessive temperature rise during the first filling step.

According to an eighth aspect of the present invention, in this case, it is preferable for fuel to be filled in the first filling step at a flowrate of no more than a minimum flowrate that is the smallest among available flowrates immediately after starting of the second filling step.

According to a ninth aspect of the present invention, in this case, it is preferable for, in a case of determining that the difference is within the permissible range in the determination step, a fuel amount present inside of the fuel tank to be calculated using the state information sent from the transmitter fuel, and fuel to be filled in the second filling step under a filling control law that decides a period to end filling based on the fuel amount.

According to a tenth aspect of the present invention, a fuel filling system includes: a vehicle having a fuel tank that stores fuel and a transmitter that externally transmits information related to the fuel tank; an external filling device having a receiver that receives the information sent from the vehicle, a mass flow meter that measures a mass flowrate of fuel filled into the fuel tank, and a filling control unit for controlling filling of fuel into the fuel tank under a predetermined filling control law; a first filling amount calculation unit for calculating a filling amount of fuel in a determination period after starting the filling of fuel by the filling control unit, using the information sent from the transmitter; a second filling amount calculation unit for calculating a filling amount of fuel in the determination period using the mass flow meter; and a determination unit for determining whether a difference between the filling amount obtained by the first filling amount calculation unit and the filling amount obtained by the second filling amount calculation unit is within a predetermined permissible range. The filling control unit changes the filling control law according to a determination result obtained by the determination unit, after starting the filling of fuel.

In the first aspect of the present invention, the filling amount of fuel within the determination period after starting the filling step under a predetermined filling control law is calculate using information sent from the vehicle side, and this is defined as a first filling amount. In addition, the filling amount of fuel within the same determination period as this is calculated using a mass flow meter provided to the external filling device, and this is defined as a second filling amount. Then, it is determined whether the difference between this first filling amount and second filling amount is within a predetermined permissible range, and the filling control law is changed according to this determination result. In particular, with the present invention, the validity of information sent from the vehicle side can be accurately determined by setting the second filling amount directly measured using the mass flow meter provided in the external filling device as a standard. In addition, the first filling amount is calculated using information sent from the vehicle side. In other words, with the first filling amount and second filling amount, it is possible to completely isolate the source of information used for calculating these into the vehicle side and external filling device side. In addition, it is assumed that the external filling device will fill fuel into an unspecified number of various types of vehicles. For this reason, generally, the accuracy of sensors used on the external filling device is higher than the accuracy of sensor equipped to individual vehicles. Therefore, it is possible to accurately determine the validity of information sent from the vehicle side by isolating the sources of information used for calculating the first filling amount and second filling amount into the external filling device side and vehicle side. In addition, by decreasing the misjudgments compared with conventionally, it is possible to also shorten the time required until refilling the fuel tank, due to not mistakenly changing to an inappropriate filling control law during the filling of fuel.

In the second aspect of the present invention, the filling step is divided into a first filling step including the period from after starting filling until the determination result is obtained, and a second step after the end of this first filling step. Then, in the first filling step, even in a state of the determination result not being obtained, i.e. even in a state of the validity of state information and characteristic information sent from the vehicle side not being proven, fuel is filled under the filling control law established using this state information and characteristic information. Then, in the second filling step, in the case of being determined that the difference is within the permissible range, i.e. in the case of proving that the state information and characteristic information sent from the vehicle side is correct, continuing from the first filling step, fuel is filled under the filling control law established using this state information and characteristic information (i.e. same filling control law as first filling step). By filling fuel under the filling control law established using the state information and characteristic information from the vehicle side irrespective of the validity thereof in the first filling step in this way, it is possible to end the first filling step as quickly as possible.

In the third aspect of the present invention, it is possible to estimate the volume of the fuel tank by a simple method, by estimating the volume of the fuel tank based on formula (1) above, using values obtained at two times during the first filling step. In addition, according to formula (1) above, it is possible to estimate the volume of the fuel tank without using the characteristic information related to the volume of the fuel tank sent from the vehicle side. Therefore, by comparing the estimated value of the volume obtained based on formula (1) above and the volume value obtained from the characteristic information from the vehicle, it is possible to improve the reliability of the volume of the fuel tank.

In the fourth aspect, the accuracy of sensors used in the external filling device is high when compared with those of the vehicle, as mentioned above. However, due to the pressure drop in the piping, the pressure detected at the pressure sensor of the external filling device during the filling of fuel is higher than the pressure inside the actual fuel tank. In the present invention, by temporarily stopping the filling of fuel at the zeroth time and first time, it is possible to establish a state in which it is possible to detect the pressure inside the fuel tank with the pressure sensor provided to the external filling device, only at both times. Since it is thereby possible to use the detection value of the pressure sensor of the external filling device, which generally has high accuracy, upon calculating the estimated value for the volume of the fuel tank, the volume can be accurately estimated.

According to the fifth aspect, in the second filling step of the present invention, in the case of the state information and characteristic information sent from the vehicle side being determined as correct (difference is within permissible range) according to the determination step, and the consistency between the volume value obtained from the characteristic information and the estimated value for the volume obtained according to the volume estimation step being confirmed, fuel is filled under the filling control law established using either of these values for volume. Since it is thereby possible to fill fuel under a filling control law established by using a value for volume with high reliability in the second filling step, it is possible to refill quickly.

According to the sixth aspect, the first filling step as mentioned above is defined as a step, among the overall filling process, until before changing the fuel filling law in response to the determination result of the determination step performed in parallel thereto. In addition, in the determination step, the validity of information sent from the vehicle side is determined by comparing the first filling amount and the second filling amount. In other words, to make the determination result in the determination step accurate, it is necessary for the fuel of a certain amount to be filled in the first filling step so that the state inside the fuel tank is stable to some extent. In this regard, in the present invention, the determination accuracy in the determination step can be appropriately managed by performing the first filling step until any among the pressure variation amount, mass variation amount, temperature variation amount, density variation amount and elapsed time exceeds a determination threshold set for each, i.e. until fuel of a certain amount is filled.

According, in the first filling step as mentioned above to the seventh embodiment, fuel is filled under the filling control law established using the state information and characteristic information for which the validity has yet to be proven at this time, until any among the pressure variation amount, mass variation amount and elapsed time exceeds the determination threshold set for each thereof. In the present invention, it is possible to prevent from reaching excessive temperature rise (temperature of fuel tank rising to a higher temperature than assumed) during the first filling step, even in a case of the filling being performed under erroneous information, by setting the determination thresholds to within a range that can prevent the occurrence of excessive temperature rise during the first filling step. In addition, by setting the determination threshold to the largest value within a range that can prevent excessive temperature rise, since it is possible to ensure time for the state inside of the fuel tank to stabilize during the first filling step, the determination accuracy in the determination step can be improved.

According to the eighth aspect, in the first filling step as mentioned above, fuel is filled under a filling control law established using state information and characteristic information for which the validity has yet to be proven at this time. In the present invention, fuel is filled in the first filling step at a flowrate of no more than the minimum flowrate that is the smallest amount among available flowrates immediately after starting the second filling step. It is thereby possible to prevent the temperature of the fuel tank from rising up to a temperature higher than assumed in the first filling step, even if the state information sent from the vehicle side was not accurate.

According to the ninth aspect, in the second filling step of the present invention, in the case of being determined that the difference is within the permissible range, the fuel amount present inside the fuel tank is calculated using the state information sent from the vehicle side, and fuel is filled under the filling control law that decides the period to complete filling based on this fuel amount. In other words, since the state information determined to be correct is used in the calculation of the fuel amount, it is possible to end the filling of fuel at an appropriate timing close to refilling.

According to the tenth aspect of the present invention, the validity of information sent from the vehicle side can be accurately determined for the same reasons as the aforementioned first aspect of the invention. In addition, according to the present invention, since it will not mistakenly change to an inappropriate filling control law during the filling of fuel due to decreasing the misjudgment compared to conventionally, it is possible to shorten the time required until refilling the fuel tank.

BRIEF DESCRIPTION OF THE DRAWINGS

FIG. 6 is a flowchart showing a sequence of filling hydrogen gas in a case of applying the present invention to a hydrogen filling system that periodically performs a leak check.

DETAILED DESCRIPTION OF THE INVENTION

Figure 1:
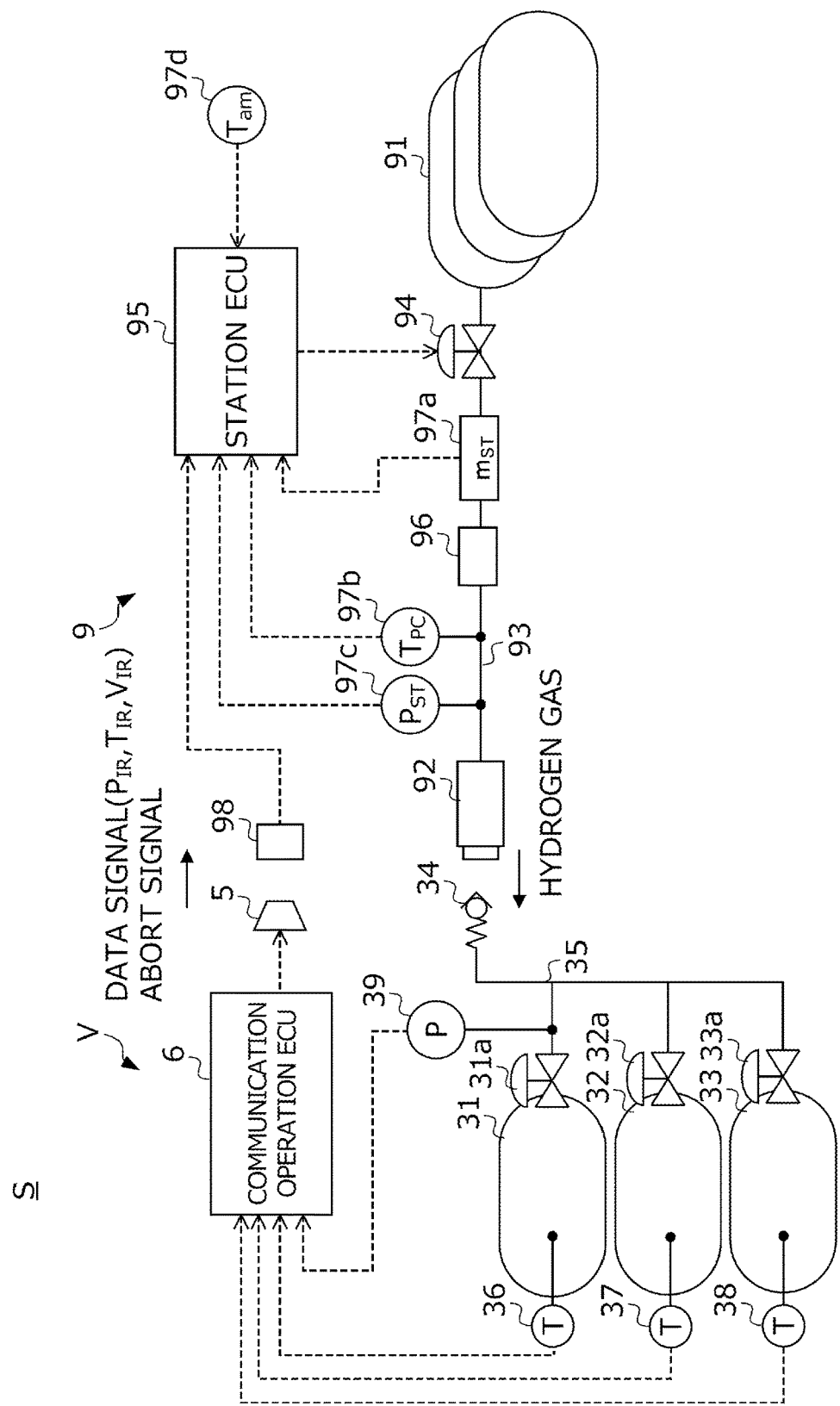
FIG. 1 is a view showing the configuration of a hydrogen filling system according to an embodiment of the present invention.

An embodiment of the present invention will be explained hereinafter while referencing the drawings. FIG. 1 is a view showing the configuration of a hydrogen filling system S to which the fuel filling method according to the present embodiment is applied. The hydrogen filling system S is configured by combining a fuel cell vehicle V that travels with hydrogen gas as the fluid fuel, and a hydrogen station 9 serving as an external filling device that supplies hydrogen gas to a hydrogen tank 31 of this vehicle V. Hereinafter, first the configuration on the vehicle V side will be explained, and then the configuration on the hydrogen station 9 side will be explained.

<Configuration of Fuel Cell Vehicle V>

The fuel cell vehicle V includes a hydrogen tank system 3 that stores hydrogen gas supplied from the hydrogen station 9, a communication operation ECU 6 that generates data signals including information related to the hydrogen tank system 3, and an infrared transmitter 5 that sends the data signals generated by the communication operation ECU 6 to the hydrogen station 9. It should be noted that illustrations for the configurations of the vehicle body and the fuel cell system that generates electricity using the hydrogen gas stored in the hydrogen tank system 3, and configurations such as the drive system that causes the vehicle body to move using the electric power generated by the fuel cell system are omitted in the vehicle V in FIG. 1.

The hydrogen tank system 3 includes a plurality (e.g., three) hydrogen tanks 31, 32 and 33 that store hydrogen gas, a receptacle 34 to which the nozzle of the hydrogen station 9 is connected during filling of hydrogen gas, an introduction pipe 35 that connects this receptacle 34 and each of the hydrogen tanks 31 to 33, temperature sensors 36, 37 and 38 that detect the temperatures inside the respective hydrogen tanks 31 to 33, and a pressure sensor 39 that detects the pressure inside the hydrogen tanks 31 to 33. The hydrogen gas pressure fed from the hydrogen station 9 during filling is filled into each of the hydrogen tanks 31 to 33 via this introduction pipe 35.

In addition, master valves 31a, 32a and 33a are provided to these hydrogen tanks 31, 32 and 33, respectively. For example, in the case of being during travel of the vehicle V, since hydrogen gas stored inside of the hydrogen tanks 31 to 33 is supplied to the fuel cell system that is not illustrated, these master valves 31a to 33a are open. In addition, these master valves 31a to 33a are each made so as to be able to open and close manually by an operator, in consideration of maintenance time of the vehicle V. Therefore, after performing maintenance, for example, in the case of the operator forgetting to open any of the master valves, there may be cases where hydrogen gas is filled from the hydrogen station 9 while the master valve remains closed.

It should be noted that, hereinafter, for a configuration including a plurality of hydrogen tanks 31 to 33 as in the vehicle V of FIG. 1, cases of simply referring to "hydrogen tank" shall indicate a single hydrogen tank virtually configured by combining this plurality of hydrogen tanks 31 to 33. Since hydrogen gas is filled into each hydrogen tank under substantially the same conditions, the hydrogen tank will not be hindered even when assuming as a configuration that is singular.

Each of the temperature sensors 36 to 38 detects the temperature of hydrogen gas in the respective hydrogen tanks 31 to 33, and sends a signal corresponding to the detected value to the communication operation ECU 6. In addition, the pressure sensor 39 detects pressure in the introduction pipe 35 in the vicinity of the hydrogen tank 31, and sends a signal corresponding to the detected value to the communication operation ECU 6.

The communication operation ECU 6 is a microcomputer configured by an interface that performs A/D conversion on the detection signals of the above-mentioned sensors 36 to 39, a CPU that executes the signal generation processing described later, a drive circuit that drives the infrared transmitter 5 in a state determined under the above-mentioned processing, a storage device that stores various data, etc.

Programs related to the execution of the data signal generation processing described later, and characteristic information including the capacity values of the hydrogen tanks 31 to 33 equipped at the time at which the vehicle V is manufactured are recorded in the storage device of the communication operation ECU 6. The hydrogen tank system 3 as mentioned above is configured by combining a plurality of the hydrogen tanks 31 to 33. Therefore, capacity value included in this characteristic information is the total value of the capacity values of the hydrogen tanks 31 to 33 at the time of manufacture. It should be noted that, in addition to the capacity value of the hydrogen tank, for example, information related to the hydrogen tank that can be specified at the time of manufacture such as the volume derived by a known conversion law from the capacity value and the material of the hydrogen tank is included in this characteristic information.

The CPU of the communication operation ECU 6 starts signal generation processing to generate a signal to be sent from the transmitter 5 to the hydrogen station 9, with the event of a fuel lid protecting the receptacle 34 being opened. In addition, the CPU of the communication operation ECU 6 ends the signal generation processing, with the event of entering a state in which filling of hydrogen gas becomes impossible by the above-mentioned nozzle being removed from the receptacle 34, for example.

In the signal generation processing, a temperature transmitted value $T_{IR}$ corresponding to the current value of the temperature in the hydrogen tank, a pressure transmitted value $P_{IR}$ corresponding to the current value of pressure in the hydrogen tank, and a volume transmitted value $V_{IR}$ corresponding to the current value of the volume of the hydrogen tank are acquired every predetermined period, and a data signal according to these values ($T_{IR}$, $P_{IR}$, $V_{IR}$) is generated. For the temperature transmitted value $T_{IR}$, for example, the average value for the detection values of the above-mentioned three temperature sensors 36 to 38, or a detection value of a representative sensor decided in advance among the three temperature sensors 36 to 38 is used. For the pressure transmitted value $P_{IR}$, for example, the detection value of the pressure sensor 39 at this time is used. In addition, for the volume transmitted value $V_{IR}$, a value recorded in the aforementioned storage device is used. It should be noted that, among these sending values $T_{IR}$, $P_{IR}$ and $V_{IR}$, the $T_{IR}$ and $P_{IR}$ are values that successively vary during filling; however, $V_{IR}$ is a fixed value that does not vary during filling.

In addition, in the signal generation processing, the temperature transmitted value $T_{IR}$ and pressure transmitted value $P_{IR}$ acquired periodically as mentioned above and abort thresholds decided in advance for each sending value are compared, and in the case of either of these sending values exceeding the abort threshold during filling, an abort signal for requesting ending of filling to the hydrogen station 9 is generated.

The drive circuit of the communication operation ECU causes the infrared transmitter 5 to be driven (flash) according to the data signals and abort signal generated by the above-mentioned signal generation processing. Data signals including state information related to the state inside the hydrogen tank (i.e. temperature transmitted value $T_{IR}$, pressure transmitted value $P_{IR}$, etc.) as well as characteristic information (i.e. volume transmitted value $V_{IR}$, etc.) and abort signals are thereby sent to the hydrogen station 9.

<Configuration of Hydrogen Station 9>

The hydrogen station 9 includes a hydrogen storage tank 91 in which hydrogen gas to be supplied to the vehicle V is stored at high pressure, a filling channel 93 from the hydrogen storage tank 91 leading to a filling nozzle 92 which is directly operated by the operator, a flowrate control valve 94 provided in the filling channel 93, and a station ECU 95 that opens and closes the flowrate control valve 94 in order to control the flowrate of hydrogen gas (hereinafter referred to as "filling flowrate") flowing in the filling channel 93.

A precooler 96 that cools the hydrogen gas is provided in the filling channel 93 between the flowrate control valve 94 and the filling nozzle 92. By cooling the hydrogen gas at a position ahead of filling to the hydrogen tank of the vehicle V by such a precooler 96, a temperature rise of the hydrogen gas in the hydrogen tank is suppressed, and thus rapid filling becomes possible.

A plurality of sensors 97a, 97b, 97c and 97d for detecting various physical quantities related to the filling of hydrogen gas is provided to the hydrogen station 9.

A mass flow meter 97a is provided in the filling channel 93 between the flowrate control valve 94 and the precooler 96, detects the mass flowrate of hydrogen gas flowing in the filling channel 93, and sends a signal corresponding to the detection value to the station ECU 5.

The gas temperature sensor 97b is provided in the filling channel 93 between the precooler 96 and the filling nozzle 92, detects the temperature of hydrogen gas in the filling channel 93, and sends a signal corresponding to the detection value to the station ECU 95.

The pressure sensor 97c is provided in the filling channel 93 between the precooler 96 and the filling nozzle 92, detects the pressure of hydrogen gas inside the filling channel 93, and sends a signal corresponding to the detection value to the station ECU 95.

The ambient temperature sensor 97d detects the temperature of the atmosphere, and sends a signal corresponding to the detection value to the station ECU 95. It should be noted that the ambient temperature detected by this ambient temperature sensor 97d may be able to be regarded as the temperature of hydrogen gas in the fuel tank of the vehicle V at the time of filling initiation.

An infrared receiver 98 for receiving data signals sent from the vehicle V is provided to the filling nozzle 92. The infrared receiver 98, when connecting the filling nozzle 92 to the receptacle 34, faces the infrared transmitter 5 of the vehicle V, whereby sending and receiving of data signals and abort signals (hereinafter referred to as "data signal, etc.") via infrared rays becomes possible between this transmitter 5 and receiver 98. When receiving data signals, etc. sent from the infrared transmitter 5, the infrared receiver 98 sends these to the station ECU 95. The sending and receiving of data signals, etc. is thereby realized between the communication operation ECU 6 and the station ECU 95. The sending and receiving of data signals, etc. via infrared rays between this transmitter 5 and receiver 98 is hereinafter also referred to as IR communication.

Figure 2:
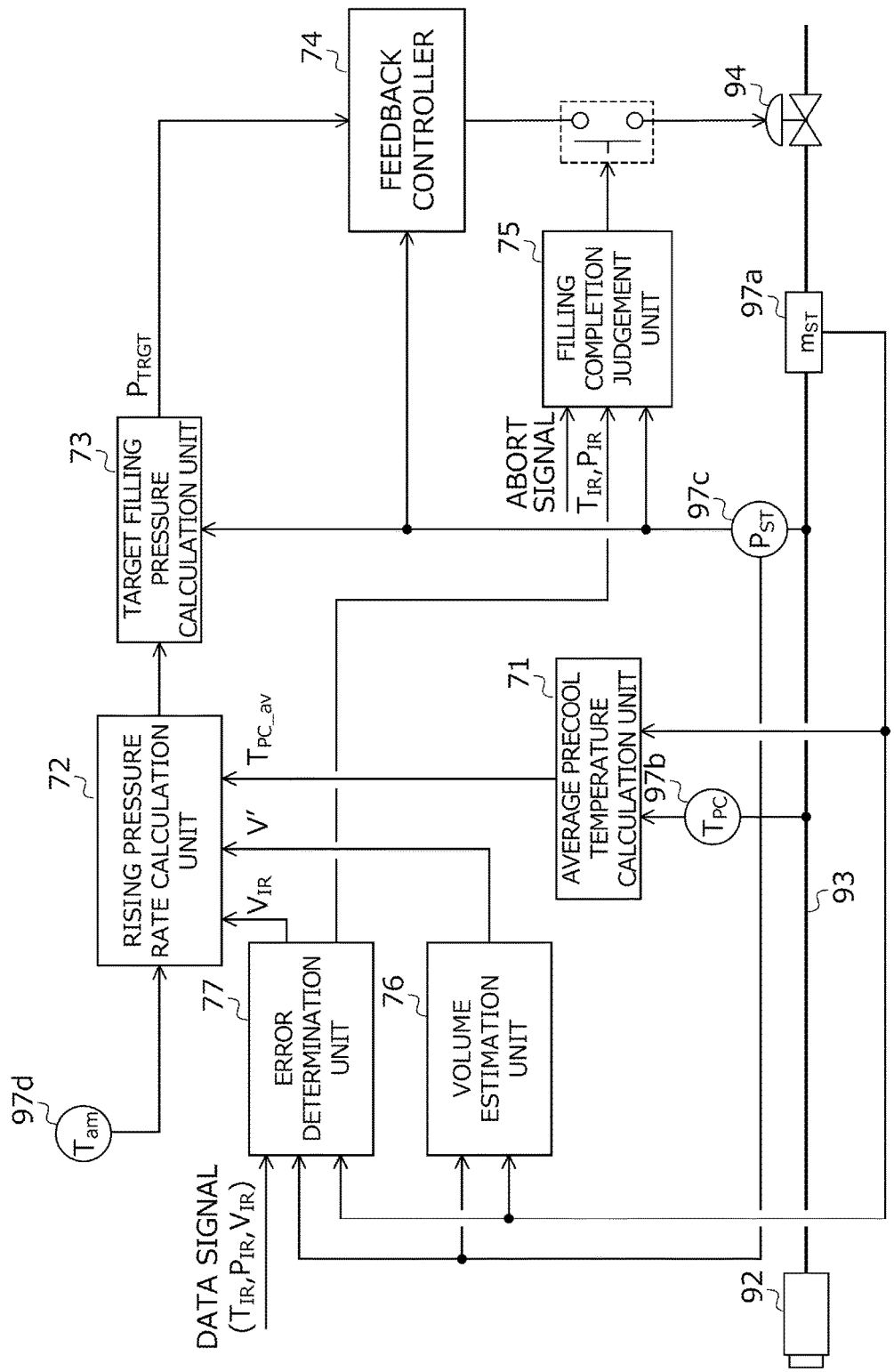
FIG. 2 is a functional block diagram showing the configuration of a control circuit for filling flowrate control by a station ECU.

The station ECU 95 controls the filling flowrate under the filling control laws such as those shown in FIG. 2 by using the output of the sensors 97a to 97d provided on the station side and the data signals by IR communication, in response to the filling of hydrogen gas and IR communication becoming possible by the filling nozzle 92 being connected to the receptacle 34 of the vehicle V.

FIG. 2 is a functional block diagram showing the configuration of a control circuit for the filling flowrate control by the station ECU 95. Hereinafter, the functions of each module 71 to 77 shown in FIG. 2 will be explained in order.

An average precooling temperature calculation unit 71 calculates an average precooling temperature $T_{PC\_AV}$ that is the average temperature of hydrogen gas after passing through the precooler, based on a detection value $T_{PC}$ of a gas temperature sensor 97b and a detection value $m_{ST}$ of the mass flow meter 97a.

A rising-pressure rate calculation unit 72 calculates a normalized filling time by using a filling time map established in advanced, the ambient temperature $T_{am}$ and average precooling temperature $T_{PC\_AV}$, and calculates a target rising-pressure rate $\Delta P_{ST}$, corresponding to the target for the rising rate of the filling pressure $P_{ST}$, by using this normalized filling time and a current detection value $P_{ST}$ (hereinafter also referred to as "filling pressure") of the station pressure sensor. It should be noted that this "normalized filling time" is not a filling time that should actually be required in the present filling, but rather refers to the virtual filling time that should be required, in a case of assuming the hydrogen tank as being a predetermined reference state (e.g., empty state), until refilling from this reference state.

In addition, "filling time map" is a map correlating the ambient temperature $T_{am}$ and average precooling temperature $T_{PC\_AV}$ with the normalized filling time. Such a filling time map is defined in the rising-pressure rate calculation unit 72 for a plurality of types, for example, every class according to volume of hydrogen tank. The rising-pressure rate calculation unit 72 selects a filling time map according to the class to which the target hydrogen tank belongs by using a volume transmitted value $V_{IR}$ sent from the vehicle side or a volume estimated value V' calculated by the volume estimation unit 76 described later, and calculates the normalized filling time and target rising-pressure rate as mentioned above.

It should be noted that the volume estimated value V' is calculated by the volume estimation unit 76 after a predetermined time since starting filling, as explained later. In addition, the volume transmitted value $V_{IR}$ can be used from immediately after the start of filling; however, it is determined by the error determination unit 77 described later a predetermined time after starting filling. Therefore, during a predetermined time after starting filling, the rising-pressure rate calculation unit 72 provisionally decides the above-mentioned filling time map according to the volume transmitted value $V_{IR}$, even in a state in which the validity of the value $V_{IR}$ has not been determined. In addition, after the volume estimated value V' has been calculated, the filling time map is decided according to the volume estimated value V' or the volume transmitted value $V_{IR}$.

The target filling pressure calculation unit 73 calculates the target filling pressure $P_{TRGT}$ corresponding to the target value for the filling pressure after a predetermined time, by using the target rising-pressure rate $\Delta P_{ST}$, calculated by the rising-pressure rate calculation unit 72 and the filling pressure $P_{ST}$.

A feedback controller 74 determines an command aperture of the flowrate control valve such that the filling pressure $P_{ST}$ becomes the target filling pressure $P_{TRGT}$, based on a known feedback control law, and inputs this to a drive device (not illustrated) of the flowrate control valve. The drive device adjusts the aperture of the flowrate control valve so as to realize this command aperture.

A filling completion judgment unit 75 judges whether filling of hydrogen gas has completed, and in the case of judging as filling having completed, sets the command aperture to 0 in order to cause filling of hydrogen gas to complete. In the filling completion judgment unit 75, three filling completion conditions such as the following are defined, for example.

The first filling completion condition is having received an abort signal from the vehicle side. The filling completion judgment unit 75 sets the command aperture to 0 in order to cause filling of hydrogen gas to end, in the case of judging that this first filling completion condition was satisfied.

The second filling completion condition is the hydrogen SOC of the hydrogen tank during filling having exceeded a predetermined completion threshold. Herein, hydrogen SOC is a value arrived at by expressing the remaining amount of hydrogen gas stored in the hydrogen tank by a percentage relative to the maximum amount of hydrogen gas that can be stored in the hydrogen tank. The filling completion judgment unit 75 calculates the hydrogen SOC during filling by inputting the temperature transmitted value $T_{IR}$ from the vehicle side and the filling pressure $P_{ST}$ into a known estimation formula, and in the case of this hydrogen SOC exceeding the above-mentioned completion threshold, sets the command aperture to 0 in order to cause the filling of hydrogen gas to end. It should be noted that, with the filling completion judgment unit 75, it may be configured so as to calculate the hydrogen SOC using the pressure transmitted value $P_{IR}$ sent from the vehicle, in place of the filling pressure $P_{ST}$ detected by the station pressure sensor, so long as being after having judged that the pressure transmitted value $P_{IR}$ is correct by the error judgment unit 77 described later (more specifically, after second filling step of S16 in the flowchart of FIG. 3 described later, for example).

The third filling completion condition is the filling pressure $P_{ST}$ having exceeding a predetermined completion threshold. The filling completion judgment unit 75 sets the command aperture to 0 in order to cause the filling of hydrogen gas to end, in the case of the filling pressure $P_{ST}$ detected by the pressure sensor having exceeded the above-mentioned completion threshold.

It should be noted that, if adopting the above-mentioned second filling completion condition, since completion of filling is judged using the hydrogen SOC of the hydrogen tank, it is possible to fill a greater amount of hydrogen gas than a case of adopting the other two filling completion conditions. However, since the data signal ($T_{IR}$) sent from the vehicle side is used in the calculation of the hydrogen SOC, in the case of these data signals being inaccurate, it is not preferable to adopt this second filling completion condition. In addition, if adopting the above-mentioned third filling completion condition, it is possible to judge the timing for completing filling without using data signals from the vehicle side. However, since it becomes so that filling completes earlier than a case of adopting the aforementioned second filling condition, it is not possible for a sufficient amount of hydrogen gas to be filled.

Considering the above such points, the filling completion judgment unit 75 determines a period for completing filling according to the first and second filling completion conditions, during a time since starting filling until the validity of data signals ($T_{IR}$, $P_{IR}$) is determined by the error determination unit 77 described later, and after being judged that the data signals ($T_{IR}$, $P_{IR}$) are accurate. In other words, the third filling completion condition is not adopted. In addition, the filling completion judgment unit 75 determines a period for completing filling according to the first and third filling completion conditions, after it is determined by the error determination unit 77 that the data signals ($T_{IR}$, $P_{IR}$) are inaccurate. In other words, the second filling completion condition is not adopted in response to being judged that the data signals ($T_{IR}$, $P_{IR}$) are inaccurate. It is thereby possible to continue the filling of hydrogen gas and fill as great an amount as possible of hydrogen gas, even if the data signals are inaccurate.

The volume estimation unit 76 calculates the estimated value V' for the volume of the hydrogen tank according to formula (2) below, using information other than the volume transmitted value $V_{IR}$ sent from the vehicle side, i.e. values acquired at two different zeroth time and first time while filling. Formula (2) below is derived by combining the real gas equations established at each of the above zeroth time and first time.

$$V' = \frac{R \cdot dm}{\frac{P_1}{T_1 \cdot Z_1(P_1)} - \frac{P_0}{T_0 \cdot Z_0(P_0)}} \quad (2)$$

In formula (2) above, "R" is the gas constant, and is a fixed value.

"dm" is a value of the filling amount of hydrogen gas between the aforementioned zeroth time and first time, for example, and a value calculated by integrating the detection value of the mass flow meter 97a between the zeroth time to first time is used.

$T_0$ and "$T_1$" are values of the temperature of hydrogen gas in the hydrogen tank at the zeroth time and first time, respectively. More specifically, for "$T_0$", for example, the detection value $T_{am}$ of the ambient temperature sensor at the zeroth time is used. In addition, "$T_1$" is calculated by inputting the detection value of the ambient temperature sensor, detection value of the gas temperature sensor, etc. into a temperature prediction formula established in advance.

"$P_0$" and "$P_1$" are values of the pressure of hydrogen gas in the hydrogen tank at the zeroth time and first time, respectively. More specifically, for example, the detection values $P_{ST}$ of the pressure sensor on the station side at the zeroth time and first time are used for "$P_0$" and "$P_1$", respectively. However, during the filling of hydrogen gas, since a pressure drop arises in the channel of hydrogen gas between the station and the vehicle, the pressure is higher on the station side than inside the hydrogen tank. Therefore, in the case of estimating "$P_0$" and "$P_1$" using the output of the pressure sensor on the station side as described above, it is preferable to temporarily stop the filling of hydrogen gas at the times of estimating this, i.e. at the zeroth time and first time.

In addition, "$Z_0(P_0)$" and "$Z_1(P_1)$" are values of the compressibility factor of hydrogen gas in the hydrogen tank at the zeroth time and first time, respectively. More specifically, they are calculated by inputting the values "$P_0$" and "$P_1$" for pressure at each time, the values "$T_0$" and "$T_1$" for temperature at each time, etc. into the estimation formula for compressibility factor established in advance as functions of the pressure of hydrogen gas in the hydrogen tank.

The error determination unit 77 determines the validity of the data signals ($T_{IR}$, $P_{IR}$, $V_{IR}$) sent from the vehicle side, by using the output of the mass flow meter 97a in a predetermined determination period after starting filling. More specifically, the error determination unit 77 determines the validity of the data signals ($T_{IR}$, $P_{IR}$, $V_{IR}$) according to the following sequence.

First, the error determination unit 77 calculates the filling amount hydrogen gas within the above-mentioned determination period by inputting the data signals ($T_{IR}$, $P_{IR}$, $V_{IR}$) sent from the vehicle side into formula (3) below. In formula (3) below, "ts" and "te" correspond to the start time and end time of the above-mentioned determination period, respectively. In addition, in formula (3) below, "$P_{IR}(te)$" and "$T_{IR}(ts)$" indicate data signals acquired at the respective times. In addition, "R" is the gas constant similarly to formula (2) above, and "$Z(P_{IR}(te))$" and "$Z(P_{IR}(ts))$" are values calculated by inputting the pressure transmitted values of each time into the estimation formula for the compressibility factor that is the same as that used in formula (2) above, respectively. It should be noted that formula (3) below is derived by combining the real gas equations established at the start time and end time, respectively, similarly to formula (2) above.

$$dm_{IR} = m(te) - m(ts) = \frac{P_{IR}(te)V_{IR}(te)}{Z(P_{IR}(te))T_{IR}(te)R} - \frac{P_{IR}(ts)V_{IR}(ts)}{Z(P_{IR}(ts))T_{IR}(ts)R} \quad (3)$$

Next, the error determination unit 77 calculates the filling amount of hydrogen gas within the above-mentioned determination period by integrating the detection values $m_{ST}$ of the mass flow mater 97a, and defines this as "$dm_{MFM}$".

Next, the error determination unit 77 calculates with formula (4) below a measurement error parameter $dm_{error}$ corresponding to a difference between the filling amount $dm_{IR}$ and $dm_{MFM}$, which were calculated by different methods as mentioned above. Then, the error determination unit 77 judges that the data signals ($T_{IR}$, $P_{IR}$, $V_{IR}$) sent from the vehicle side are correct in the case of this measurement error parameter $dm_{error}$ being within a predetermined permissible range (e.g., 15%), and judges that the data signals ($T_{IR}$, $P_{IR}$, $V_{IR}$) sent from the vehicle side are inaccurate in the case of the measurement error parameter $dm_{error}$ being outside the above-mentioned permissible range.

$$dm_{error} = \left| \frac{dm_{IR}}{dm_{MFM}} - 1 \right| \quad (4)$$

Figure 3:
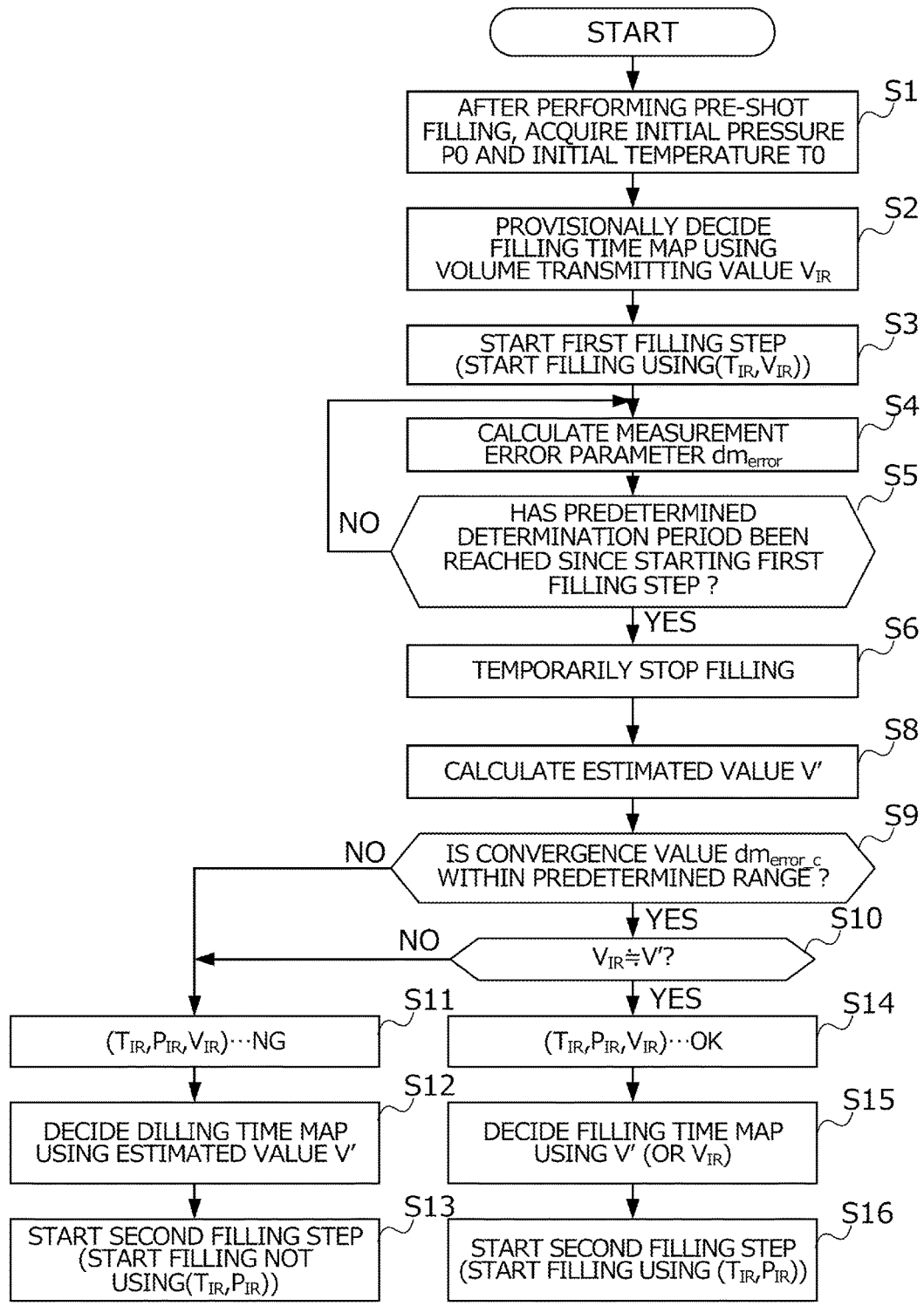
FIG. 3 is a flowchart showing a sequence of filling hydrogen gas in a hydrogen filling system.

Next, a specific sequence of filling hydrogen gas in the hydrogen filling system will be explained. FIG. 3 is a flowchart showing a sequence of filling hydrogen gas in the hydrogen filling system. This processing starts in response to the filling nozzle of the hydrogen station being connected to the receptacle of the vehicle, and entering a state in which the filling of hydrogen gas and IR communication are possible.

In S1, the hydrogen station acquires the initial pressure $P_0$ of the hydrogen tank and the initial temperature $T_0$ of the hydrogen tank, after forming pre-shot filling. This pre-shot filling is processing that experimentally fills hydrogen gas of an amount on the order of several tens to hundreds of grams over a few seconds. Hereinafter, filling after this pre-shot filling ends is defined as main filling. In addition, herein, the initial pressure $P_0$ of the hydrogen tank is acquired based on the output of the pressure sensor provided to the station, for example. The initial temperature T0 of the hydrogen tank is acquired based on the output of an external temperature sensor provided to the station, for example. In addition, hereinafter, a time that is a period in which filling is temporarily stopped after the pre-shot filling is performed, in which this initial pressure $P_0$ and initial temperature $T_0$ are acquired, is defined as the zeroth time (time t0 in FIG. 5 described later).

In S2, the hydrogen station provisionally decides a filling time map for the rising-pressure rate calculation unit of FIG. 2, using the volume transmitted value $V_{IR}$ sent from the vehicle.

In S3, the hydrogen station starts a first filling step. In this first filling step, the filling flowrate is controlled under the filling control law prepared using the data signals ($T_{IR}$, $V_{IR}$) sent from the vehicle. More specifically, in this first filling step, the filling flowrate is controlled under the filling time map provisionally decided according to the volume transmitted value $V_{IR}$ as mentioned above. In addition, the temperature transmitted value $T_{IR}$ is used in order to judge whether the first and second filling completion conditions are satisfied in the filling completion judgment unit of FIG. 2.

In S4, the hydrogen station calculates the measurement error parameter $dm_{error}$ with the aforementioned zeroth time as the initial time and current as the end time, by inputting the data signals ($T_{IR}$, $P_{IR}$, $V_{IR}$) sent from the vehicle and the detection value $m_{ST}$ of the mass flow meter provided to the station into formulas (3) and (4) above, and saves the calculated value in a predetermined buffer.

In S5, the hydrogen station determines whether the predetermined determination period has arrived since starting the first filling step. More specifically, the hydrogen station determines whether any, among a pressure variation amount, mass variation amount, temperature variation amount and density variation amount in the fuel tank from the aforementioned zeroth time to current, and elapsed time from the zeroth time to current, have exceeded the determination threshold set for each. In the case of the determination in S5 being NO, the processing returns to S4 to continue the filling of hydrogen gas, and in the case of the determination in S5 being YES, the processing advances to S6 to temporarily stop the filling of hydrogen gas. Herein, the preferred setting of the determined threshold in S5 will be explained.

Figure 4:
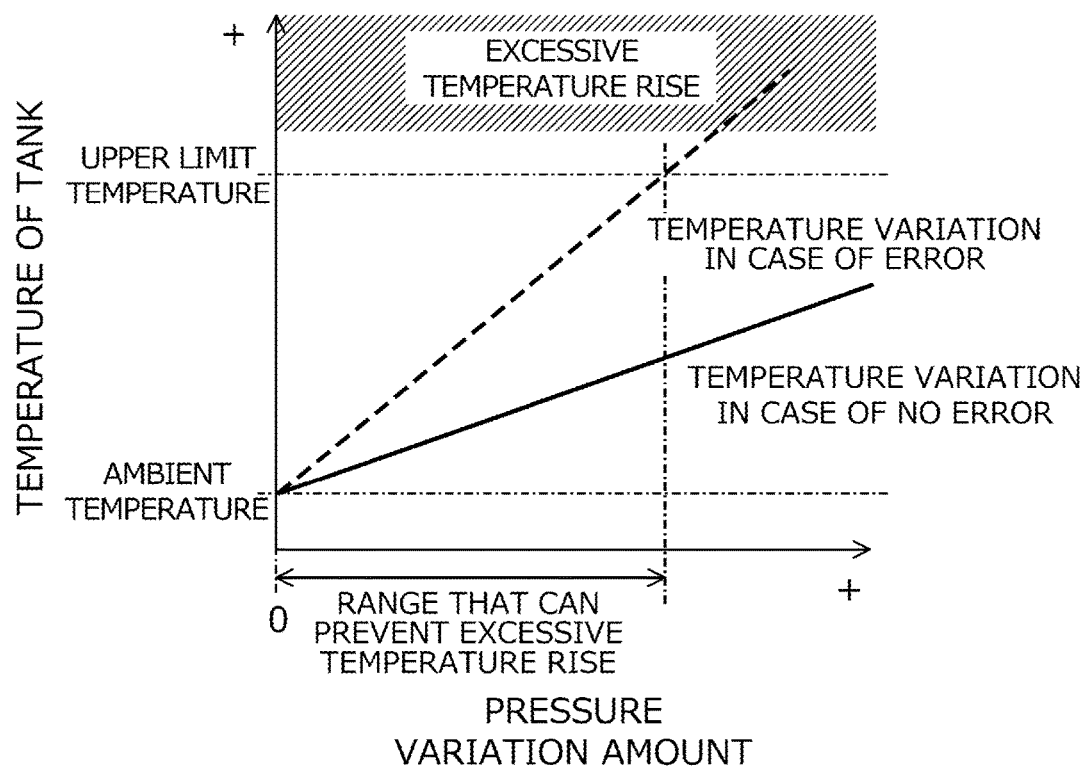
FIG. 4 is a graph showing a relationship between the pressure variation amount and temperature of the hydrogen tank immediately after starting filling.

FIG. 4 is a graph showing a relationship between the pressure variation amount (horizontal axis) and temperature of the hydrogen tank (vertical axis) immediately after starting filling. In FIG. 4, the temperature of the hydrogen tank at the moment of starting filling is assumed to be equal to the ambient temperature. Although the temperature of the hydrogen tank rises from the ambient temperature in concert with the increase in the pressure variation amount when starting filling as shown in this graph, the rising speed thereof varies according to the type of filling time map that is provisionally decided based on the volume transmitted value $V_{IR}$ in S3. Herein, in the case of the volume transmitted value $V_{IR}$ being an appropriate value representing the actual volume value of the hydrogen tank, since a filling time map appropriate according to the actual hydrogen tank is selected, it will not result in excessive temperature rise as shown by the solid line in FIG. 4. However, in the case of the volume transmitted value $V_{IR}$ being an inappropriate value differing from the volume value of the actual hydrogen tank, if continuing filling under an inappropriate filling time map, the temperature of the hydrogen tank may rise in a short time and result in excessive temperature rise, as shown by the dotted line in FIG. 4.

In S5, assuming that there are cases where error (particularly, discrepancy between the volume transmitted value and volume value of the actual hydrogen tank) exists in the data signals sent from the vehicle side, the determination threshold is set to a magnitude such that is able to prevent the occurrence of excessive temperature rise caused by such error in the data signals during the first filling step. In other words, the determination threshold is set to an appropriate magnitude such that filling of hydrogen gas is temporarily stopped prior to reaching excessive temperature rise, even if error existed in the data signals. More specifically, the determination threshold for the pressure variation amount, for example, is set as shown in FIG. 4, for example. For example, assuming error such that the temperature rising speed of the hydrogen tank is the fastest among the various errors assumed in the data signals (refer to dotted line in FIG. 4), in the case of filling hydrogen gas under data signals including such error, the pressure variation amount is measured at the moment at which the temperature of the hydrogen tank exceeds a predetermined upper-limit temperature established so as to reliably prevent the occurrence of excessive temperature rise. The determination threshold for the pressure variation amount is set within a range from 0 to measured value, as shown by the arrow in FIG. 4. It should be noted that although a case of setting the determination threshold for the pressure variation amount is explained with FIG. 4, determination thresholds are also set for the mass variation amount, temperature variation amount, density variation amount and elapsed time according to the same sequence. By setting the determination threshold to within such ranges, even if any error is included in the data signals, it is possible to prevent from resulting in excessive temperature rise during the first filling step.

It should be noted that it is necessary for the measurement error parameter to mostly converge to a predetermined value in order to accurately determine the validity of the data signals by the processing of S9 described later. In addition, immediately after starting filling, since the state inside the tank is not stable, and thus the outputs of the temperature sensor and pressure sensor on the vehicle side are not stable, the measurement error parameter calculated based on these also becomes unstable, and the validity of the data signals cannot be determined accurately. Therefore, in order to raise the determination accuracy, a larger determination threshold is preferable so as to be able to ensure time until the outputs of sensors on the vehicle side stabilize. For this reason, the determination threshold is preferably set to the largest value within a range (0 to measured value) that can prevent the occurrence of the aforementioned excessive temperature rise. It is thereby possible to raise the determination accuracy for the validity of data signals as high as possible, while preventing the occurrence of excessive temperature rise.

Referring back to the explanation of FIG. 3, the hydrogen station temporarily stops the filling of hydrogen gas in S6, and the processing advances to S8. In S8, the hydrogen station calculates the estimated value V' for the volume of the fuel tank using formula (2) above. More specifically, by inputting the values ($P_0$, $T_0$, $Z_0(P_0)$) acquired at the aforementioned zeroth time, the values ($P_1$, $T_1$, $Z_1(P_1)$, dm) acquired at present when filling is temporarily stopped (time t1 in FIG. 5 described later) into formula (2) above, the estimated value V' for the volume of the hydrogen tank is calculated.

In S9, the hydrogen station calculates a convergence value $dm_{error\_c}$ for the measurement error parameter $dm_{error}$ calculated for each time, and determines whether this convergence value $dm_{error\_c}$ is within a predetermined permissible range (e.g., within 15%).

In the case of judging that the convergence value $dm_{error\_c}$ of the measurement error parameter is outside the permissible range in S9, the processing advances to S11. In S11, the hydrogen station judges that any of the data signals ($T_{IR}$, $P_{IR}$, $V_{IR}$) sent from the vehicle side are inaccurate, and the processing advances to S12. In this judgment and after, the data signals ($T_{IR}$, $P_{IR}$, $V_{IR}$) sent from the vehicle are judged as being inaccurate by the hydrogen station, and will not be used in filling control.

In S12, using the estimated value V' calculated in S8, the filling time map is selected again in the rising-pressure rate calculation unit of FIG. 2. A filling time map used in the filling thereafter is thereby decided.

In S13, the hydrogen station starts a second filling step. In S13 and after, following that it was judged that the data signals from the vehicle side are inaccurate, the filling flowrate is controlled under a filling control law not using the data signals ($T_{IR}$, $P_{IR}$, $V_{IR}$) sent from the vehicle. In other words, in the filling completion judgment unit of FIG. 2, the period for completing filling is judged according to the first and third filling completion conditions not using the data signals ($T_{IR}$, $P_{IR}$).

In the case of judging in S9 that the convergence value $dm_{error\_c}$ for the measurement error parameter is within the permissible range, the processing advances to S10. In S10, the hydrogen station determines whether the volume transmitted value $V_{IR}$ and the estimated value V' are almost equal ($V_{IR} \approx V'$?). In the case of the determination of S10 being YES, the processing advances to S14.

In addition, in the case of the determination of S10 being NO, i.e. in the case of the volume transmitted value $V_{IR}$ and the estimated value V' not being equal, the processing advances to the aforementioned S11. As shown in formulas (3) and (4) above, in the measurement error parameter, all three types of data signals ($T_{IR}$, $P_{IR}$, $V_{IR}$) sent from the vehicle are used. Therefore, in the case of determining that the convergence value of the above-mentioned measurement error parameter is within the permissible range, the three types of data signals ($T_{IR}$, $P_{IR}$, $V_{IR}$) are all accurate, and therefore, the volume transmitted value $V_{IR}$ and estimated value V' are considered to also be about equal. However, in considering exceptions, in the case of the determination of S10 being NO, the processing advances to S11, and it is judged that any of the data signals ($T_{IR}$, $P_{IR}$, $V_{IR}$) is inaccurate.

In S14, the hydrogen station judges that all of the data signals ($T_{IR}$, $P_{IR}$, $V_{IR}$) sent from the vehicle are accurate, and the processing advances to S15. In S15, using the estimated value V' calculated in S8 (or the volume transmitted value $V_{IR}$ determined to be accurate), a filling time map is selected again in the rising-pressure rate calculation unit of FIG. 2, whereby the filling time map is decided. It should be noted that since the volume transmitted value $V_{IR}$ and estimated value V' are determined as being about equal, the filling time map will not be replaced with a different one in the processing of S15.

In S16, the hydrogen station starts the second filling step. In S16 and after, following that it was judged that all of the data signals from the vehicle side are accurate as mentioned above, the filling flowrate is controlled under a filling control law using the data signals ($T_{IR}$, $P_{IR}$) sent from the vehicle. In other words, in this case, with the filling completion judgment unit of FIG. 2, similarly to the first filling step, the period for completing filling is judged according to the first and second filling completion conditions using the data signals ($T_{IR}$, $P_{IR}$).

Figure 5:
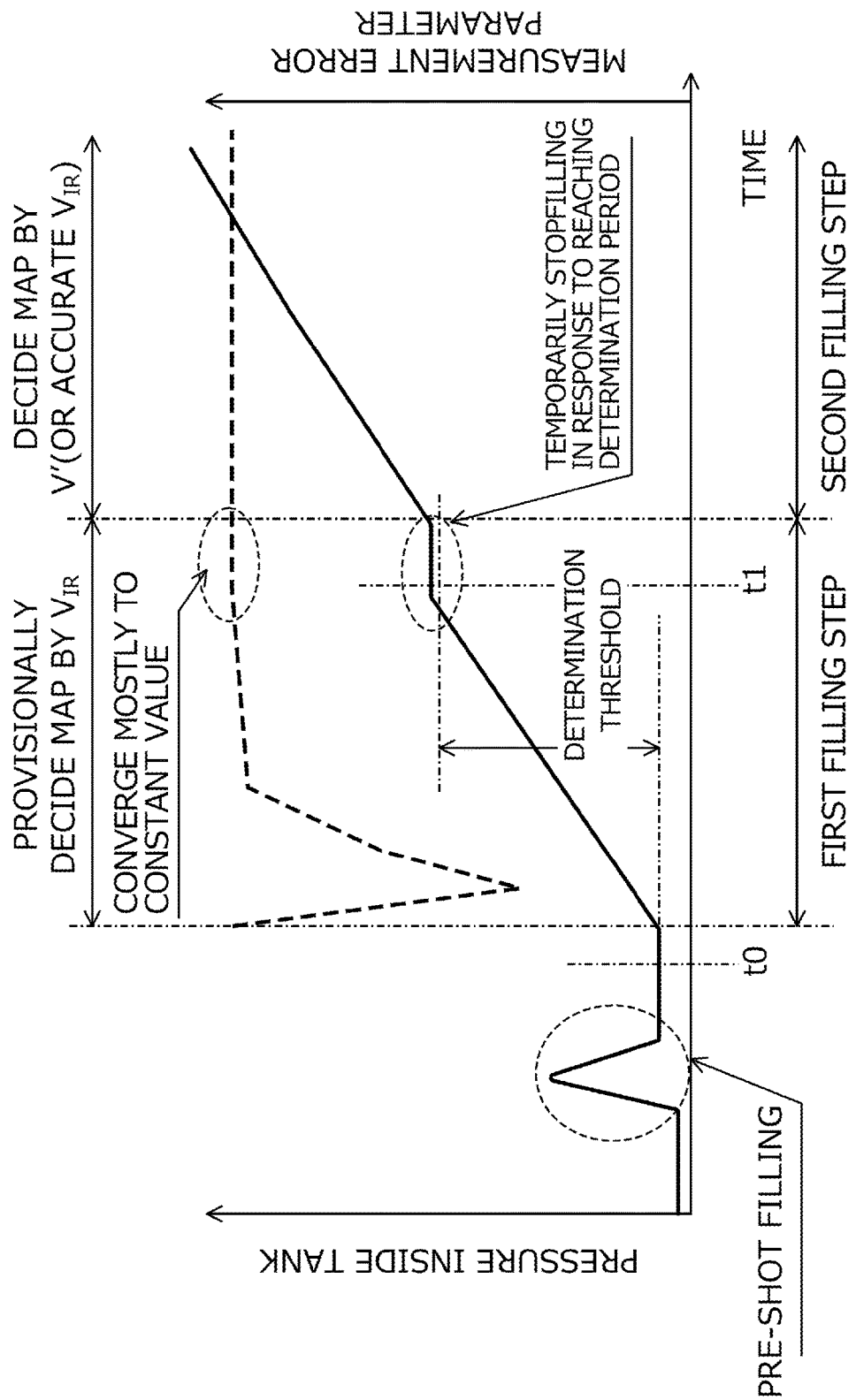
FIG. 5 is a time chart schematically showing the flow of filling of hydrogen gas realized by the flowchart of FIG. 3.

FIG. 5 is a time chart schematically showing the flow of filling of hydrogen gas realized by the flowchart of FIG. 3. In FIG. 5, the solid line indicates the variation in pressure inside the tank, and the dotted line indicates the variation in the measurement error parameter. In the present embodiment, the main filling after pre-shot filling has ended is formally divided into the two steps of a first filling step including a period from starting filling until the validity of the data signals ($T_{IR}$, $P_{IR}$) is determined in S9 (refer to S2 to S12, S14 and S15), and a second filling step after the completion of this first filling step (refer to S13 and S16).

When starting the first filling step, the measurement error parameter is calculated using the data signals ($T_{IR}$, $P_{IR}$, $V_{IR}$) sent from the vehicle (refer to S4). This measurement error parameter, despite greatly diverges from the actual value and being inaccurate as shown in FIG. 5 immediately after starting the first filling step, converges to a predetermined value as filling progresses. In addition, in the first filling step, a suitable time for the measurement error parameter to converge mostly to a fixed value is estimated and the filling of hydrogen gas is temporarily stopped (refer to S5 and S6), and the validity of the data signals ($T_{IR}$, $P_{IR}$, $V_{IR}$) is determined along with calculating the estimated value V' for the volume (refer to S8 and S9). The validity of the data signals ($T_{IR}$, $P_{IR}$, $V_{IR}$) is determined using the measurement error parameter $dm_{error}$ that is calculated using a predetermined determination period in the first filling step (refer to S9). In addition, the estimated value V' is calculated using values acquired at time t0 and time t1 at which filling is temporarily stopped during the first filling step (refer to S8).

In addition, in the first filling step, along with the determination of the validity of the data signals and calculating the estimated value V', the filling flowrate is controlled using the filling time map provisionally decided according to the volume transmitted value $V_{IR}$ for which the validity is undetermined (refer to S2). Then, in the second filling step, along with changing the filling control law according to the determination results for the validity of the above-mentioned data signals (refer to S13 and S16), the filling flowrate is controlled using the filling time map decided according to the estimated value V' calculated in the first filling step (refer to S12 and S15).

Since the filling time map provisionally decided according to the volume transmitted value $V_{IR}$ for which validity is undetermined is being used in the first filling step in the above way, in the case assuming that an erroneous volume transmitted value $V_{IR}$ was used, for example, the temperature of the hydrogen tank may rise to a temperature higher than assumed while performing the first filling step.

Such an excessive temperature rise can be avoided in S5 of FIG. 3 by setting the determination thresholds that are set for the pressure variation amount, mass variation amount, elapsed time, etc. to values as small as possible, and ending the filling of hydrogen gas in the first filling step as quickly as possible. In other words, even if filling is performed under an erroneous volume transmitted value $V_{IR}$, it is preferable to set the above-mentioned determination thresholds to values as small as possible by performing simulations and experiments, etc. using actual equipment, so as to reach the determination period prior to an excessive temperature rise occurring, and the filling in the first filling step is stopped temporarily. It should be noted that this determination threshold is preferably as large as possible in order to improve the determination accuracy, due to being established by measuring the pressure variation amount, mass variation amount, elapsed time, etc. required in order for the measurement error parameter to converge as mentioned above. Therefore, this determination threshold is set to the smallest value within a range that can ensure sufficient convergence of the measurement error parameter, so that the aforementioned such excessive temperature rise does not occur.

In addition, such an excessive temperature rise can also be avoided by forcibly decreasing the filling flowrate of hydrogen gas in the first filling step. More specifically, in the first filling step, since the rise in temperature of the hydrogen tank in the first filling step can be suppressed as much as possible by filling hydrogen gas at a flowrate of no more than the minimum flowrate that is the smallest among flowrates allowable immediately after the start of the second filling step (more specifically, the filling flowrate realized under the filling control law of FIG. 2, in the case of selecting the filling time map according to a tank of the smallest volume, and assuming that the precool temperature rose the highest among assumable temperatures), it is possible to avoid the aforementioned such excessive temperature rise.

Although an embodiment of the present invention has been explained above, the present invention is not to be limited thereto. The configurations of the detailed parts may be modified as appropriate within the scope of the gist of the present invention.

For example, in the above-mentioned embodiment, a hydrogen station adopting a filling control law that can vary the rising-pressure rate as shown in FIG. 2 is explained as an example; however, the present invention is not limited thereto. The present invention can also be applied to a hydrogen station adopting a filling control law that fixes the rising pressure speed.

In addition, in the above-mentioned embodiment, filling continues upon switching the filling time map, in the case of determining the data signals ($T_{IR}$, $P_{IR}$, $V_{IR}$) as being inaccurate (case of determination of S9 being NO)); however, the present invention is not limited thereto. In the case of determining the data signals as being inaccurate, it may end filling.

In addition, in the above-mentioned embodiment, a case of executing the measurement error determination processing of data signals sent from the vehicle (processing consisting of calculation of measurement error parameter $dm_{error}$ in S4 of FIG. 3, and determination of whether convergence value $dm_{error\_c}$ of measurement error parameter in S9 is within permissible range) only one time immediately after the start of filling is explained; however, the number of times executing this measurement error determination processing is not limited thereto. This measurement error determination processing can be performed in parallel while filling hydrogen gas. Therefore, even if after starting the second filling step under the filling control law established according to the first-time determination result, it may repeatedly perform the measurement error determination processing in parallel. In addition, regarding the measurement error in data signals in the measurement error determination processing in and after this second filling step, in the case of a determination result differing from the previous determination result being obtained, it may be configured so as to change the filling control law again according to the latter determination result.

In addition, as explained referencing FIGS. 3 to 5, in order to accurately calculate the estimated value V', and ensure time for switching the filling time map according to the determination result of the above-mentioned measurement error determination processing, the filling is temporarily stopped (refer to S6 of FIG. 3). On the other hand, a hydrogen filling system established so as to temporarily stop the filling of hydrogen gas periodically during filling and perform a leak check confirming the existence of filling leaks has been proposed recently. The present invention can be applied also to a hydrogen filling system that performs such leak checks.

FIG. 6 is a flowchart showing the sequence of filling hydrogen gas in the case of applying the present invention to a hydrogen filling system that periodically performs leak checks. S21 to S24 and S28 to S36 in the flowchart of FIG. 6 are the same as S1 to S4 and S8 to S16 in the flowchart of FIG. 3, respectively; therefore, detailed explanation thereof will be omitted.

In S25, the hydrogen station determines whether having reached a period for executing leak check an Nth time (N is an integer of at least 1), after starting the first filling step. In the case of the determination of S25 being NO, the processing returns to S24 and continues the filling of hydrogen gas, and in the case of the determination of S25 being YES, the processing advances to S26. Herein, the above-mentioned integer N is decided by measuring the number of times leak check is required in order for the actual measurement error parameter to converge by performing experiments in advance, similarly to the determination thresholds in S5 of FIG. 3.

In S26, the hydrogen station temporarily stops the filling of hydrogen gas, and the processing advances to S27. In S27, the hydrogen station performs leak check to determine the presence of a filling leak based on the convergence value of the detection value $P_{ST}$ of the pressure sensor after temporarily stopping the filling of hydrogen gas, and then the processing advances to S28.

In the case of applying the present invention to a hydrogen filling system that periodically performs leak check in the above way, it is effective due to being able to calculate the estimated value V' using the period in which filling is temporarily stopped in order to execute the leak check, and being able to ensure time for switching the filling time map.

What is claimed is:

1. A fuel filling method for a fuel filling system that includes: a vehicle having a transmitter for externally transmitting information related to a fuel tank, and an external filling device that fills fuel into the fuel tank using the information sent from the vehicle, the method comprising:
    filling fuel into the fuel tank from the external filling device under a predetermined filling control law;
    calculating a filling amount of fuel within a determination period after starting the filling, using the information sent from the transmitter;
    calculating a filling amount of fuel in the determination period, using a mass flow meter provided to the external filling device; and
    determining whether a difference between the filling amount obtained in the first filling amount calculation and the filling amount obtained in the second filling amount calculation is within a predetermined permissible range,
    wherein the filling control law is changed according to a determination result after starting the filling of fuel,
    wherein the filling is divided into a first filling that includes a period from after starting filling until the determination result is obtained, and a second filling from after ending the first filling,
    wherein the information transmitted from the transmitter includes state information related to the state of fuel inside of the fuel tank, and characteristic information including a volume value of the fuel tank,
    wherein fuel is filled in the first filling under a fuel control law established using the state information and the characteristic information even in a state of the determination result not having been obtained, and
    wherein fuel is filled in the second filling under a filling control law established using the state information and the characteristic information or equivalent information thereto, in a case of determining that the difference is within the permissible range.

2. The fuel filling method according to claim 1, further comprising calculating an estimated value V' for the volume of the fuel tank according to the below formula, using values acquired at a predetermined zeroth time and first time while performing the first filling, $$V' = \frac{R \cdot dm}{\frac{P_1}{T_1 \cdot Z_1} - \frac{P_0}{T_0 \cdot Z_0}}$$

wherein, in the formula, "R" is a predetermined fixed value, "dm" is a value of a filling amount of fuel between the zeroth time and the first time obtained by the mass flow meter, "$T_0$" and "$T_1$" are values of the temperature of fuel inside the fuel tank at the zeroth time and the first time, respectively, "$P_0$" and "$P_1$" are values of the pressure of fuel inside the fuel tank at the zeroth time and the first time, respectively, and "$Z_0$" and "$Z_1$" are values of the compressibility factor of fuel inside the fuel tank at the zeroth time and the first time, respectively.

3. The fuel filling method according to claim 2,
wherein filling of fuel is temporarily stopped at the zeroth time and the first time in the first filling, and
    wherein the "$P_0$" and "$P_1$" are measured values of a pressure sensor provided to the external filling device at the zeroth time and the first time, respectively.

4. The fuel filling method according to claim 3, wherein fuel is filled in the second filling under a filling control law established using a volume value obtained from the characteristic information or an estimated value obtained, in a case of determining that the difference is within the permissible range and the difference between the volume value obtained from the characteristic information and the estimated value obtained being within a predetermined measurement error range.

5. The fuel filling method according to claim 3, wherein fuel is filled in the first filling until any of a pressure variation amount, mass variation amount, temperature variation amount, density variation amount of fuel inside the fuel tank from a moment starting filling of fuel and an elapsed time from the moment starting filling of fuel exceeds a determination threshold set for each thereof.

6. The fuel filling method according to claim 5, wherein the determination threshold is set to the largest value within a range that can prevent the occurrence of excessive temperature rise during the first filling.

7. The fuel filling method according to claim 3, wherein fuel is filled in the first filling at a flowrate of no more than a minimum flowrate that is the smallest among available flowrates immediately after starting of the second filling.

8. The fuel filling method according to claim 3, wherein, in a case of determining that the difference is within the permissible range, a fuel amount present inside of the fuel tank is calculated using the state information transmitted from the transmitter, and fuel is filled in the second filling under a filling control law that decides a period to end filling based on the fuel amount.

9. The fuel filling method according to claim 2, wherein fuel is filled in the second filling under a filling control law established using a volume value obtained from the characteristic information or an estimated value, in a case of determining that the difference is within the permissible range and the difference between the volume value obtained from the characteristic information and the estimated value being within a predetermined measurement error range.

10. The fuel filling method according to claim 2, wherein fuel is filled in the first filling until any of a pressure variation amount, mass variation amount, temperature variation amount, density variation amount of fuel inside the fuel tank from a moment starting filling of fuel and an elapsed time from the moment starting filling of fuel exceeds a determination threshold set for each thereof.

11. The fuel filling method according to claim 10, wherein the determination threshold is set to the largest value within a range that can prevent the occurrence of excessive temperature rise during the first filling.

12. The fuel filling method according to claim 2, wherein fuel is filled in the first filling at a flowrate of no more than a minimum flowrate that is the smallest among available flowrates immediately after starting of the second filling.

13. The fuel filling method according to claim 2, wherein, in a case of determining that the difference is within the permissible range, a fuel amount present inside of the fuel tank is calculated using the state information transmitted from the transmitter, and fuel is filled in the second filling under a filling control law that decides a period to end filling based on the fuel amount.

14. The fuel filling method according to claim 1, wherein fuel is filled in the first filling until any of a pressure variation amount, mass variation amount, temperature variation amount, density variation amount of fuel inside the fuel tank from a moment starting filling of fuel and an elapsed time from the moment starting filling of fuel exceeds a determination threshold set for each thereof.

15. The fuel filling method according to claim 14, wherein the determination threshold is set to the largest value within a range that can prevent the occurrence of excessive temperature rise during the first filling.

16. The fuel filling method according to claim 1, wherein fuel is filled in the first filling at a flowrate of no more than a minimum flowrate that is the smallest among available flowrates immediately after starting of the second filling.

17. The fuel filling method according to claim 1, wherein, in a case of determining that the difference is within the permissible range, a fuel amount present inside of the fuel tank is calculated using the state information transmitted from the transmitter, and fuel is filled in the second filling under a filling control law that decides a period to end filling based on the fuel amount.

18. A fuel filling system comprising:
a vehicle having a fuel tank that stores fuel and a transmitter that externally transmits information related to the fuel tank;
an external filling device having a receiver that receives the information transmitted from the vehicle, a mass flow meter that measures a mass flowrate of fuel filled into the fuel tank, and a filling control unit for controlling filling of fuel into the fuel tank under a predetermined filling control law;
a first filling amount calculation unit for calculating a filling amount of fuel in a determination period after starting the filling of fuel by the filling control unit, using the information transmitted from the transmitter;
a second filling amount calculation unit for calculating a filling amount of fuel in the determination period using the mass flow meter; and
a determination unit for determining whether a difference between the filling amount obtained by the first filling amount calculation unit and the filling amount obtained by the second filling amount calculation unit is within a predetermined permissible range,
wherein the filling control unit changes the filling control law according to a determination result obtained by the determination unit, after starting the filling of fuel,
wherein the filling is divided into a first filling that includes a period from after starting filling until the determination result is obtained, and a second filling from after ending the first filling,
wherein the information transmitted from the transmitter includes state information related to the state of fuel inside of the fuel tank, and characteristic information including a volume value of the fuel tank,
wherein fuel is filled in the first filling under a fuel control law established using the state information and the characteristic information even in a state of the determination result not having been obtained, and
wherein fuel is filled in the second filling under a filling control law established using the state information and the characteristic information or equivalent information thereto, in a case of determining that the difference is within the permissible range.

* * * * *